March 14, 1939.  S. MORSE  2,150,452
METHOD OF AND APPARATUS FOR ABSORPTION OF GASES IN LIQUIDS
Filed May 18, 1936   2 Sheets-Sheet 2

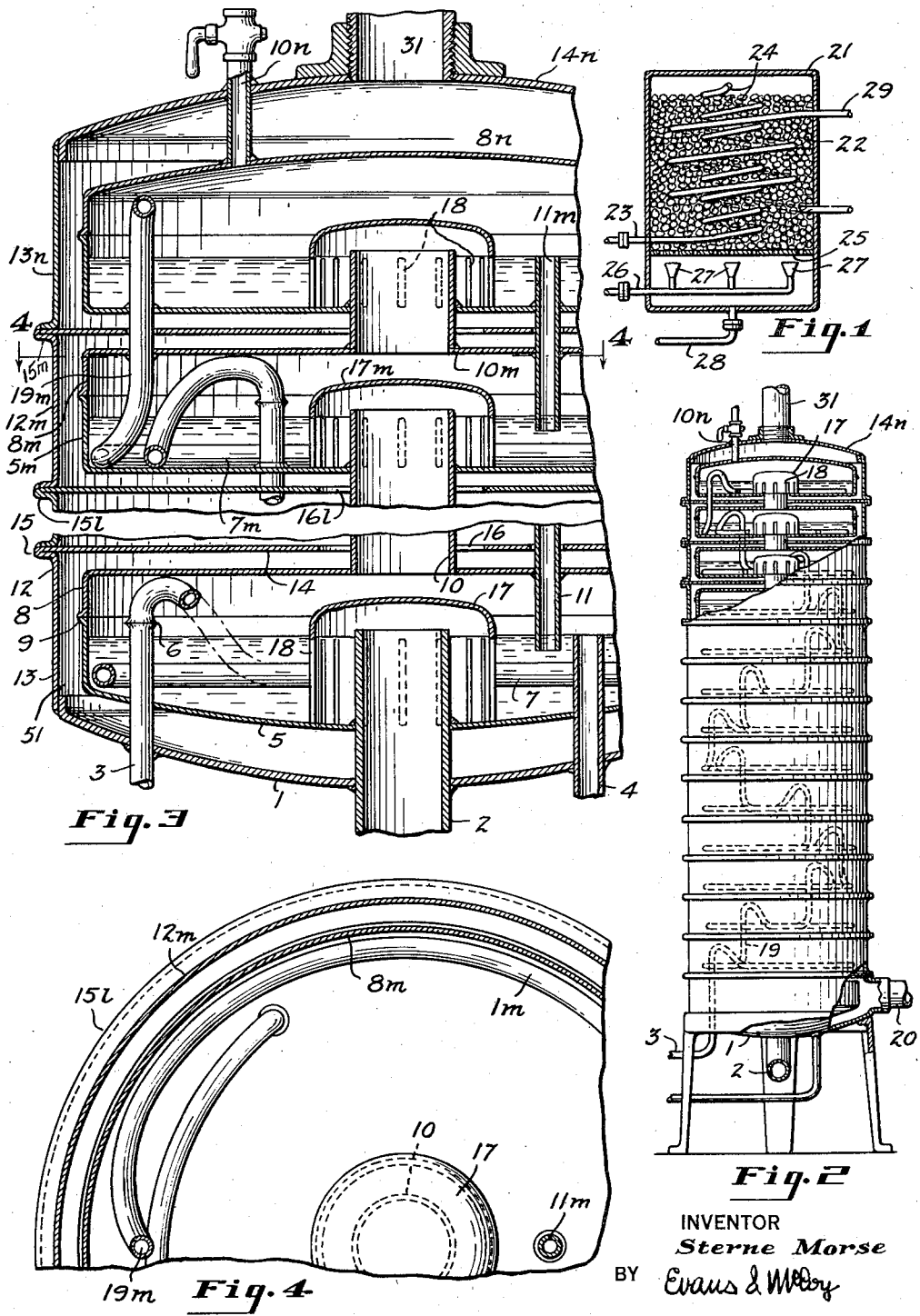

INVENTOR
Sterne Morse
BY Evans & McCoy
ATTORNEYS

Patented Mar. 14, 1939

2,150,452

UNITED STATES PATENT OFFICE 2,150,452

METHOD OF AND APPARATUS FOR ABSORPTION OF GASES IN LIQUIDS

Sterne Morse, Richmond Heights, Ohio

Application May 18, 1936, Serial No. 80,247

6 Claims. (Cl. 261—11)

This invention is a continuation in part of my invention concerned with systems of heat distribution, Serial No. 693,211, now Pat. No. 2,040,869.

In that application there is described a method of heat distribution comprising the generation of ammonia vapor under moderate pressure from a watery solution of ammonia, its distribution to the points to which it is desired to distribute heat energy, together with the resulting weaker solution of ammonia, its absorption in that solution and the return of the resulting strong solution to the central station where the process is repeated. The method of absorption of a gas in a solvent for that gas, outlined in that application is the subject of the present one.

In the process of absorption of a gas in a liquid in which it is soluble, it is practically universally true that the lower the temperature is at which absorption is carried out, the larger is the amount of the gas which can be absorbed for a given pressure. A second practically universal rule is that the gas in the process of solution gives out a considerable amount of sensible heat, in the case of ammonia amounting to its latent heat of vaporization, plus a variable amount of heat depending on the concentration of ammonia in the solution which is absorbing it. A corollary to these facts is the fact that solution of the gas will occur and heat will be given out by the solution of it at any temperature up to the equilibrium temperature for the pressure and concentration of the gas in the absorbing solution. As the concentration of the gas in the liquid increases, this equilibrium temperature decreases. It follows that if we wish to obtain heat energy from the absorption at the highest possible temperature, it is necessary to cause the gas to be absorbed into as weak a solution as possible, while if we desire as strong a solution as possible it is necessary to cause the gas to be absorbed at as low a temperature as possible. Whether our problem, as is the case in the before mentioned application, is primarily a problem in heat engineering, or whether the problem is primarily a chemical one, as is the case in the processing of natural gas to remove the heavier constituents, economy in materials will in general require the combination of both desiderata.

This combination can be obtained, owing to the fact that the heating of a liquid is a nonisothermal procedure. If accordingly, we conduct our absorption in many stages, the temperature falling to lower levels from stage to stage, the concentration of gas in the solution rising from stage to stage, heat will be evolved at a constantly rising temperature as we proceed from the last stage to the first. If now water or other cooling liquid is brought successively in thermal contact with the various stages, from last to first, it may be heated to a temperature very near the temperature at which the incoming weak solution is in equilibrium with the gas at the working pressure. Conversely a solution of the gas may be obtained very near to the concentration which would be in equilibrium with the gas at the temperature of the incoming cooling medium.

It is immaterial to the broad purposes of this invention whether these stages are definitive or indefinite. Apparatus will later be described for either condition and for a combination of them. Its purposes are met if (1) the absorbing liquid is raised before any absorption is permitted to occur to the highest temperature reigning in the apparatus; (2) the heat evolved in the process of absorption is removed nonisothermally in such a way as to make the irreversibilities as small as possible. As the concentration of the absorbed gas in the absorbing liquid increases, its equilibrium temperature, that is the temperature at which evaporation of the gas from or absorption of the gas in the solution is possible according as heat is supplied or abstracted, decreases. If, during absorption, heat were constantly removed from the absorbing liquid at such a rate that the latter would be at all times in equilibrium with the gas it was absorbing, the process would be a strictly reversible one from the thermodynamic point of view. Such a condition would however afford no potential which would cause the process to go in any definite direction, towards absorption or evaporation. In practice it is therefore necessary that the absorbing liquid be maintained at a sufficient temperature interval below the equilibrium temperature to cause absorption of the gas to occur at the desired rate, this rate increasing with the interval. Since the equilibrium temperature decreases with increase of concentration of the gas in the liquid, maintenance of a set temperature interval between the equilibrium temperature and the actual temperature of the liquid means decreasing the latter with increase of concentration of the gas in the liquid in what might be called a parallel course with that of the equilibrium temperature, but always below it. In practice, the maintenance of a set temperature interval between the equilibrium temperature and the actual temperature of the absorbing solution can be in general only approximately carried out. For example in the case of the solution of ammonia in water at 90 lbs./sq. in., if the same solution is carried from one end of the absorber to the other, increasing in amount by the gas absorbed only, the amount of heat evolved for a given fall in the equilibrium temperature is roughly three times as great at 50% molar concentration of the solution as it is at 15%. This may be adjusted for by increasing the amount of cooling liquid flowing through the apparatus at such points of high heat evolution or a larger temperature difference between absorbing liquid and cooling liquid may be allowed in the interval where the production of heat is small for a given temperature change, the choice depending on the particular problem. Or more absorbing liquid may be used at the lower concentration, the amount of cooling liquid remaining the same at all stages.

Referring now to the figures, Figure 1 shows an absorber of the filled type substantially as shown in the above cited application.

Figure 2 shows an absorber of the sectional type, partly broken away to show the construction in vertical central section.

Figure 3 shows in vertical central section and on a larger scale than in Fig. 2, the top, bottom, and one intermediate sections of the apparatus shown in Fig. 2.

Figure 4 is a horizontal section, taken along the line 4—4 in Fig. 3, of the same apparatus.

Figure 5:
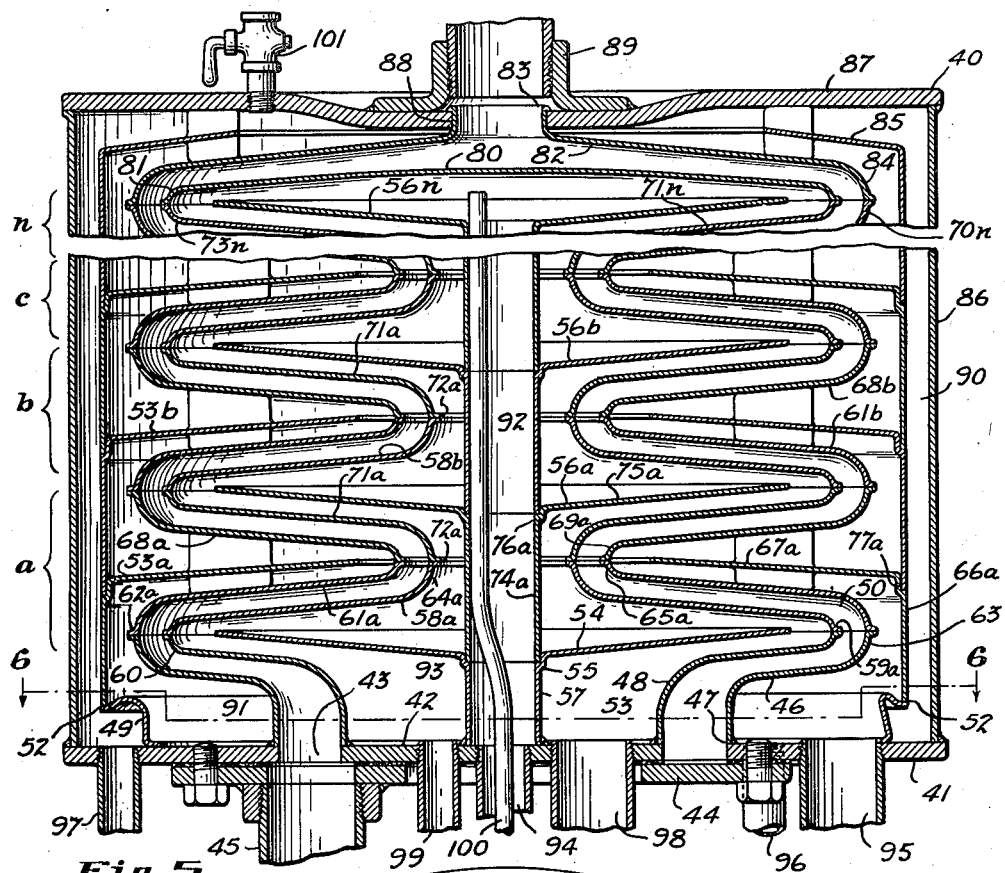
Figure 5 shows in central vertical section, an apparatus neither purely sectional in operation nor of the filled type but partaking of the characteristics of each type of construction.

Referring now to Figs. 2-4, the apparatus shown is in general similar to the familiar fractionating distilling column, with the addition of means for bringing the incoming weak solution to the temperature of the hottest part of the column, which in contrast to the distilling column is the top, rather than the bottom, and in the addition of means for cooling the various sections of the column with an ascending path for cooling water. The design is adapted to stamped elements and welded construction, all the joints enclosing the reacting gas and solution being of that character.

A circular base plate 1, upwardly concave, is centrally bored for the passage of a vapor pipe 2 passing through it vertically and projecting a short distance above its upper surface. The joint between them is rendered tight in any desired way as by welding. At suitable distances from its centre the plate 1 is bored for the passage through it of weak and strong liquor pipes 3 and 4, these pipes being shown as welded in place though they may be made tight in any other desired manner. They also project above the upper surface of plate 1, but pipe 4 does not project as high as vapor pipe 2. A dish like member 5 rests on plate 1, resting on radial ribs, not shown. The member 5 is also centrally bored for the passage of vapor pipe 2 and is welded to the latter which ends a short distance above its bottom surface. Weak liquor pipe 3 and strong liquor pipe 4 also pass in similar fashion through the bottom of member 5 and are similarly welded thereto, the pipe 4 ending a short vertical distance below the upper edge of pipe 2. Pipe 3 ends at any convenient point in a coupling 6, by which it is joined with a horizontal coil 7, lying above the bottom of member 5.

A cover 8 to member 5 is provided of similar dish like form but inverted, and is placed edge to edge over member 5, the two edges being welded together at the weld 9. As was the case with member 5, the cover 8 is centrally bored for connection to a vapor pipe 10, which is welded thereto. Cover 8 is also bored for the passage through it of two other pipes, a strong liquor pipe 11 and a weak liquor pipe 19 (Fig. 2) similar in position, form and function to weak liquor pipe 19m in a higher section. These pipes are positioned radially at points corresponding to the positions of the pipes 3 and 4, but rotated a convenient number of degrees on the vertical axis therefrom to prevent interference. A bubble cap 17 is placed with its edge resting on the bottom of member 5, and covering the projecting portion of pipe 2. The edge of this cap is provided with slots 18 through which the ascending vapor passes.

The base plate 1 extends radially a short distance beyond the outer edge of member 5 and welded to its outer edge is one section 12 of the casing, consisting of an outer cylindrical portion 13 and a top horizontal portion 14. This is shown as a deep drawn stamping, the metal being folded over at the corner between the portions 13 and 14, to form a fillet 15. The horizontal portion 14 is centrally bored to afford passage of the vapor pipe 10, but the hole is considerably larger than that pipe, an annular aperture 16 being thereby provided. It is also bored to afford passage for the pipes 11 and 19 carrying the strong and weak liquors but is not welded to them, the holes however, closely fitting the pipes. When in place, the plate 1, together with the casing section 12, form the outer wall of a water channel 51, completely surrounding the vessel formed by the member 5 and its cover 8, the wall of this vessel forming the inner wall. The description of the lowest section may be completed by noting that the pipes 11 and 19 are welded to the cover 8 at the point where they pass through it, the lower edge of pipe 11 being positioned somewhat below the upper edge of pipe 4, and the pipe 19 constituting a continuation of coil 7.

There has now been described the last or lowest section of the absorber. Each element in it is repeated in each other section from bottom to top. For example the next section to the top, consists of a bottom member 5m, cover 8m, bubble cap 17m, and casing section 12m, as its principal members. The vertical pipe section 19l passes through the bottom or member 5m and is welded thereto in precisely the same manner as the pipe 3 in relation to member 5. Similarly the vapor pipe 10l and strong liquor pipe 11l pass through and are welded to member 5m in the same way as are pipes 2 and 4 with respect to member 5. Finally the casing section 12m is attached to the fillet 15l in the same way in which section 12 is attached to the edge of base plate 1. For the sake of clearness, not all these relationships are shown for every section but all are shown in one or another of the sections which are drawn.

The top section is different in certain respects from the other sections. The weak liquor pipe 19m, passing through the bottom of bottom member 5n, does not connect with a coil lying in the section as is the case with the other sections, but ends freely within the section. There is of course no strong liquor pipe leading from a section above as is the case with the other sections. The section is provided with a small pipe 10n, welded into the cover 8n, used however solely for purging purposes, to allow removal of insoluble gases in the gas being absorbed. A casing section 13n, completing the cylindrical portion of the casing is welded to the fillet 15m of the preceding casing section and to it is welded the head 14n of the casing. This head is bored for the passage through it of the pipe 10n which is welded to it. It is also provided with the water connection 31.

It will be seen that the various coils 7 ... 7m and their connecting portions, form a continuous channel in close thermal contact with each section from bottom to top, in which the entering weak liquor is heated successively to the temperature of the top section or nearly so. Also, it will be seen that the cooling water, entering the water channel around the lowest section by the pipe 20 passes successively about every section from bottom to top and is heated at each point, the temperature difference being however nowhere large. Absorption of the gas occurs at every point at a temperature not far removed from the equilibrium temperature for the reigning pressure and concentration. If necessary, as above noted, a portion of the cooling water may be led off at an intermediate point to permit this relationship to be more exact, depending on whether it is desired to have the cooling water at a high temperature or not.

A simpler apparatus, but working according to the same principle, already described in the above cited application of which this is a continuation in part, is shown in Fig. 1. Here there is shown a vessel 21, of any convenient dimensions, the upper portion of the interior being filled with any suitable finely divided substance 22 such as steel wool, this being for the purposes of preventing convection and mixing of different concentrations of liquid as far as possible within the vessel. The substance 22 is supported by a horizontal porous plate 25 placed a short distance above the bottom. A pipe 23 passes within the vessel 21 just above the plate 25 and ascends within it as coil 24 to the top where it ends freely. A pipe 26 passes into the vessel 21 below the plate 25 ending in suitable nozzles 27. A pipe 28 carries the strong liquor out of the bottom of the apparatus. A coil of pipe 29 passing from bottom to top of the vessel carries cooling water.

Operation is similar in principle to that already described for the apparatus of Figs. 2–4. Vapor is introduced into the vessel 21 by the pipe 26 and is blown into the liquid through nozzles 27. Weak liquid is introduced through pipe 23, ascends to the top of the apparatus through coil 24, being heated on the way and reaches to top, practically at the temperature of the hottest part of the apparatus. Here it passes into the general body of liquid and slowly passes downward, being cooled by the water in coil 29. Its ability to take up the vapor is thereby increased and the latter is absorbed to a higher and higher concentration as the liquid travels toward the bottom.

Figure 6:
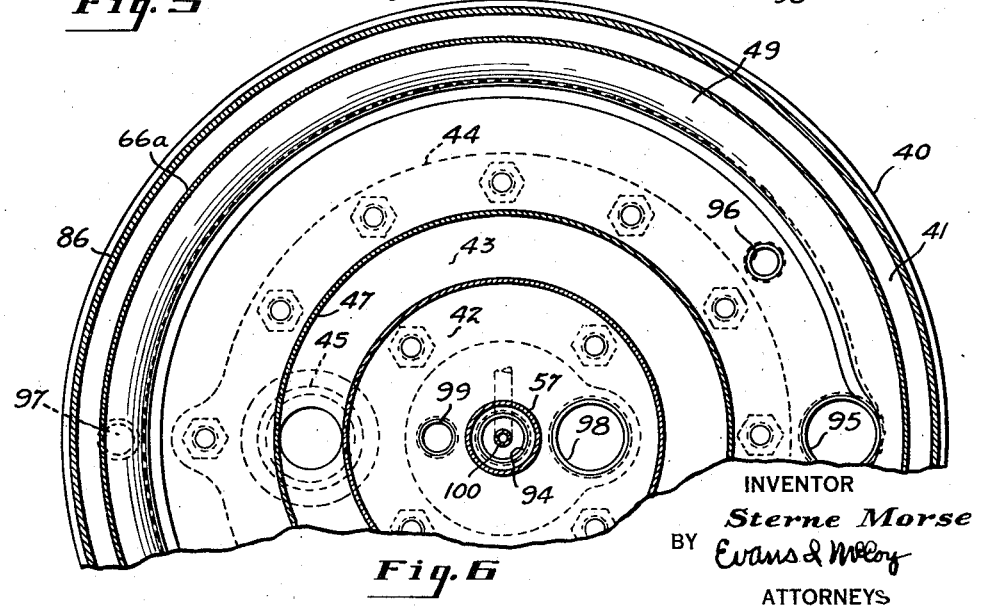
Figure 6 is a horizontal section along the line 6—6 in Fig. 5 of the same apparatus shown in that figure.

Turning now to the type of apparatus figured in Figs. 5 and 6, it will be noted to have characteristics partaking of both the previous types in that on the one hand the body of liquid is a single one and on the other, that owing to the circuitous channels provided the absorbing liquid is cut up into sections, or more exactly, forced to follow such a long narrow channel, that the primary desideratum of ascending concentration and descending temperature along the course of the liquid is attained.

Referring now to these figures, there is shown a generally cylindrical vessel 40 not so long in proportion to its diameter as is the case with the apparatus shown in Figs. 2–4. It is provided with a base plate in two portions, an outer annular section 41, and an inner circular section 42, of somewhat smaller outside diameter than the internal diameter of section 41. There is therefore, when the two sections are in position, a narrow annular channel 43 between them. An annular cap piece 44 covers this channel 43 and is bolted to sections 41 and 42, the joint being made water tight by suitable gaskets. It serves to position sections 41 and 42 in the same horizontal plane and also to afford a supply of water to channel 43. It is suitably provided with a pipe connection 45 for this purpose.

A stamped steel member 46 of the general shape of the frustum of a very flat cone is placed with large base upward above base section 41. The metal constituting the small edge of member 46 is turned downward to form a vertically disposed edge 47 of the same diameter as the internal diameter of base section 41. This edge is welded to the upper inner edge of base section 41. The lower inner edge of a similar member 48, which however, is somewhat smaller in both internal and external diameter is similarly welded to the upper edge of base section 42 in such manner that when these base sections are in position members 46 and 48 constitute the lowest portion of a water channel 50, this portion being shaped generally as the frustum of a flat cone extending from and continuing the channel 43 radially outward and upward. Before however, the member 46 is welded to section 41, there is placed in position in the annular space between them a metal partition 49, ring-like in form, a lower inner edge being fastened to base plate 41 in any desired way as by spot welding, the outer and upper edge being fastened to a partition 53a later to be described, an annular socket 52 being provided on the outer edge of partition 49 to receive its edge. There is also placed in position a second metal partition or baffle 54 in general form similar to member 48 but of both smaller external and internal diameter. It has an internal cylindrical portion 57 longer than the corresponding portion of member 48 and is provided with the annular recessed portion 55 for the reception of the lower edge of a partition or baffle 56a later to be described.

The parts now to be described constitute one entire section of the apparatus which is repeated as many times as may be desired in an identical manner until the top section is reached. This section a is above the bottom section, has above it section b and so on.

A member 58a, generally conically shaped, of the same external diameter as member 48 but with the small end upward and extending much further towards the centre axis than does member 48 has its lower and external edge turned downward while the upper edge 60 of member 48 is turned upward. These two edges are welded together, a small horizontal fillet on each being provided for convenience in so doing. A member 61a of the same external diameter as member 46 generally conically shaped and with small end upward and extending toward the centre nearly as far as member 58a has an external edge 62a turned down this edge meeting the turned up upper edge 63 of member 46, to which it is welded. The channel 50 is thereby continued on an upward and inward conical path. The inner edge 64a of the member 58a is turned upward as is the inner edge 65a of the member 61a. After these members are placed in position, there is placed in position the partition 53a. This consists of an outer and lower cylindrical portion 66a and an inner conical portion 67a, downwardly concave. A recessed portion 77a is provided at their junction for the reception of the lower edge of a similar partition 53b above. As before mentioned the lower edge of the portion 66a rests in the recessed portion 52 of member 49.

There is now placed in position the member 68a, generally conical, with large base upward having the turned down inner edge 69a, this edge being approximated to and welded to the turned up inner edge 65a of member 61a. Similarly a member 71a having a turned down inner edge 72a has this edge welded to the turned up inner edge 64a of member 58a. Finally the section is completed by the placing in position of the partition 56a which has an inner vertically cylindrical portion 74a, joined to a conical portion 75a with concavity upward, the lower edge of cylindrical portion 74a being placed in the recessed portion 55 of partition 54 and having itself a recessed portion 76a for the reception of the lower edge of a similar partition 56b.

Just as the section a has the six members 58a, 61a, 53a, 68a, 71a and 56a so has the next section b above six similar members 58b—56b similarly numbered. The member 58b is welded to the member 71a by their outer edges and the member 61b is similarly welded to member 68a. The partition 53b is placed in position, its lower edge resting in the recessed portion 77a of partition 53a. Members 68b and 71b are similarly welded to members 61b and 58b respectively and the partition 56b is placed in position, its lower edge resting in the recess 76a.

Sections are continued upward in this manner to any number n. The construction of the top section follows. A member 80 generally conical and like member 58a except that it has no central orifice, has its edge 81 which is turned down, welded to the outer and upper edge 73n of member 71n. A member 82 generally similar to member 61a extends further toward the central axis and its inner and upper edge 83 is turned up further than is the case with member 61a. Its outer and lower edge 84 is welded to the outer and upper edge 70n of member 68n. A partition 85 entirely similar to partition 53a except that the internal diameter is larger, is placed with its lower edge resting in the recessed portion of partition 53n and the inner structure of the absorber is in general completed.

There is now welded to the outer edge of base section 41 a cylindrical outer shell 86. This shell is suitably flanged at the top to facilitate the securing to it of the top plate 87 here shown as welded. The central portion of plate 87 is somewhat depressed, and is centrally bored with a hole 88 of such size and so positioned that the top edge 83 of member 82 projects through and this edge is thereupon welded to the top inner edge of hole 88. A flanged pipe connection 89 is fastened to top plate 87 covering hole 88.

It will now be seen that there has been constructed a continuous water channel 50 the radial section of which zigzags upward and radially in and out from bottom to top. We have moreover an outer annular channel 90 formed by the shell 86 as outer wall and the member 49 and the various sections 66a—66n and the partition 85 as inner wall. This communicates at the top of the apparatus with a channel 91 formed by the outer walls of channel 50 and by the partitions 53a—53n, its section being also generally zigzag radially and downward. Similarly we have on the central side of channel 50 a cylindrical channel 92 corresponding to channel 90 leading upward and communicating with the channel 93 which zigzags radially downward.

The base section 41 is provided near its external edge with pipe connection 97, communicating with channel 90 and the base section 42 is similarly provided with a pipe connection 94 near its centre communicating with channel 92. Base section 41 is also provided with two pipe connections opening into channel 91, one of comparatively large size, 95, for entering vapor, the second 96 for carrying away strong liquor. Base section 42 is also provided with two pipe connections communicating with channel 93, the larger 98 supplying vapor and the smaller 99 carrying away strong liquor. Two small pipes 100 and 101 are provided for purging of any incondensible gases the first connected into the channel 92 and passing to the top of this channel and the second connected into the top plate 87 and thereby communicating with the tops of channels 90 and 91.

Operation of this apparatus is in principle precisely the same as that of the other two types. Weak liquor ascends in each of the channels 90 and 92, and is heated. At the top of these channels it passes into channels 91 and 93 where it commences to descend. In these channels it meets an ascending current of vapor coming from the vapor pipes 95 and 98 delivering vapor into these channels. Owing to the form of these channels the vapor tends to spread in sheets on the under surface of each conical wall or partition limiting the space flowing upward and in countercurrent to the liquid flowing downward below it. A very good contact is thereby attained and good absorption capacities are in consequence possible.

It will be seen that I have described a method of gas absorption of high efficiency and economy particularly to be sure for use in the system of heat distribution for which it was especially designed but having also numerous applications in various chemical processes and in refrigerating systems of the absorption type. Furthermore convenient and adequate apparatus for carrying out the method of absorption herein described have been described both as to construction and as to operation.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. The method of absorption of a gas in a solvent for said gas said solvent having a boiling point higher than that of the gas at substantially unchanging pressure except for hydrostatic differences, which comprises bringing said solvent to a relatively high temperature out of contact with said gas, causing absorption of said gas in said solvent to a proportion determined by such high temperature, removing the heat developed by said absorption at such high temperature by a cooling agent at a small temperature difference below such high temperature, further cooling said solvent to a lower temperature, further absorbing said gas to a concentration determined by such lower temperature, further removing the heat developed by such further absorption to a cooling agent at a new lower temperature and continuing said cooling of solvent, additional absorption of gas and removal of heat by a cooling agent to the desired concentration of gas in the solvent and low temperature.

2. The method of absorption of a gas in a solvent having a boiling point higher than that of the gas which comprises bringing the solvent to a comparatively high temperature out of contact with said gas, and causing coincidently, cooling of the solvent and absorption of the gas therein at a constantly descending series of temperatures and constantly increasing series of concentrations of the gas in the solvent.

3. In an apparatus for the absorption of a gas in a solvent having a boiling point higher than that of the gas, means for heating the solvent to a high temperature out of contact with said gas, means for contacting said solvent at such high temperature with a portion of said gas, means for removing heat from said solvent whereby said solvent is brought to a lower temperature, means for contacting the cooled solvent with a further portion of said gas at said lower temperature and means for further cooling said solvent.

4. In an apparatus for carrying out a reaction between a gas and a liquid, a partition with a lower surface, said partition forming also one surface of a heat flow conduit for causing heat flow to occur across said partition, said lower surface being nearly horizontal and possessing a lower and an upper edge, and being immersed in said liquid, means for conducting said gas to a location beneath said surface and within said liquid, whereby said gas is caused to flow with relative slowness under said surface and in contact with said liquid from a lower point to a higher point within said apparatus, means for collecting said gas at such higher point, and means for causing heat flow to occur across said partition.

5. In an apparatus for carrying out a reaction between a gas and a liquid, a conical partition so disposed that the axis of the cone is substantially vertical, the angle of said cone at the vertex approaching two right angles, said partition being immersed as regards its lower surface in said liquid, said partition forming also one surface of a heat flow conduit for causing heat flow to occur across said partition, said lower surface comprising a frustum of said cone, means for introducing said gas within said liquid at a location adjacent to the lower edge of said lower surface, whereby said gas is caused to flow with relative slowness along elements of said surface from lower to higher points within said apparatus, under said surface and in contact with said liquid, means for collecting said gas at such higher points, and means for causing heat flow to occur across said partition.

6. In an apparatus for carrying out a reaction between a gas and a liquid, a partition consisting of a plurality of relatively flat coaxial conical surfaces, so placed as to be alternately concave upward and downward, coaxial conical baffles with concavities directed downward, one such baffle being placed directly above each downwardly concave portion of said partition, said baffles and the outwardly directed surface of such partition being immersed in said liquid, means for introducing said gas at a low point in such apparatus and below one of said upwardly concave surfaces of said partition whereby it is caused to pursue a course first beneath said upwardly concave surface radially outward and upward, then beneath a conical baffle radially inwards and upward and so, alternately beneath conical surfaces of said partition and said conical baffles until an upper part of said apparatus is reached, means for collecting said gas from said upper part of said apparatus, and means for causing heat flow across said partition.

STERNE MORSE.